Jan. 10, 1967  J. B. ROGERS ET AL  3,297,347
COMBINATION DOOR BUMPER AND HOLDER
Filed Oct. 15, 1964  2 Sheets-Sheet 1

INVENTORS
JOHN B. ROGERS
JEROME K. NAGEL
BY
Anderson, Spangler & Wymore

INVENTORS
JOHN B. ROGERS
JEROME K. NAGEL

BY
Anderson, Spangler & Wymore

United States Patent Office 3,297,347
Patented Jan. 10, 1967

3,297,347
COMBINATION DOOR BUMPER AND HOLDER
John B. Rogers, 2052 S. Fillmore, Denver, Colo. 80210, and Jerome K. Nagel, 275 S. Milwaukee, Denver, Colo. 80206
Filed Oct. 15, 1964, Ser. No. 404,007
5 Claims. (Cl. 292—74)

This invention relates to door hardware and more particularly to a combination door bumper and holder.

Usually, most if not all existing door bumpers make no provision for selectively holding a door in an open position. It is the primary purpose of this invention to provide a combined door bumper and holder which combines the function of absorbing the shock of limiting the opening of a door and of securing the door in open position regardless of the angle at which the door, mounting the bumper, approaches the wall, mounting the holder.

Various devices have been provided in the past for retaining doors in open position and other devices have been provided to function as a bumper to absorb the shock of limiting the opening of a door. Most of these devices are useful only where the door in open position lies in parallel relation to the wall mounting the holding or retaining device. The present invention includes a door bumper and holder in combined form which cooperates to absorb the shock of limiting the opening of a door and selectively hold the door in open position even though the door is substantially beyond the parallel position.

The object of this invention, therefor, is to provide a combination door bumper and holder which limits the opening movement of a door and selectively holds the door in open position even though the door is not resting in parallel position to the wall.

A further object is to provide a combination door bumper and holder which is simple of construction, attractive and economical of manufacture.

All the foregoing and still further objects and advantages of this invention will become apparent from a study of the following specification, taken in connection with the accompanying drawing, wherein.

In accordance with the present invention, the combined door bumper and holder comprises an arm having a base flange on one end for mounting the arm on a door; a bumper of resilient material connected to the end of the arm opposite the end having the base flange; a recess opening onto a side of the arm, adjacent the end to which the bumper is connected; a cylindrically shaped strike positioned in the recess for limited movement only transversely of the arm; spring means biasing the striker to project outwardly beyond the side of the arm, and a bumper plate having a circular concave recessed portion to receive the bumper and an elongated cylindrical roller positioned to extend axially of the recess in position to pass the strike in retracted position against the spring and permit the strike to extend and be retained therebehind.

Figure 1:
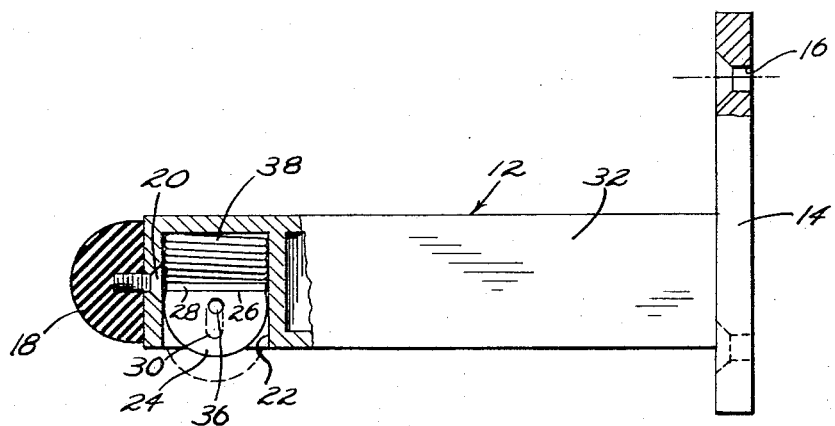
FIGURE 1 is a plan view of the probe of the combined bumper and holder made in accordance with the invention, partly in section.
Figure 2:
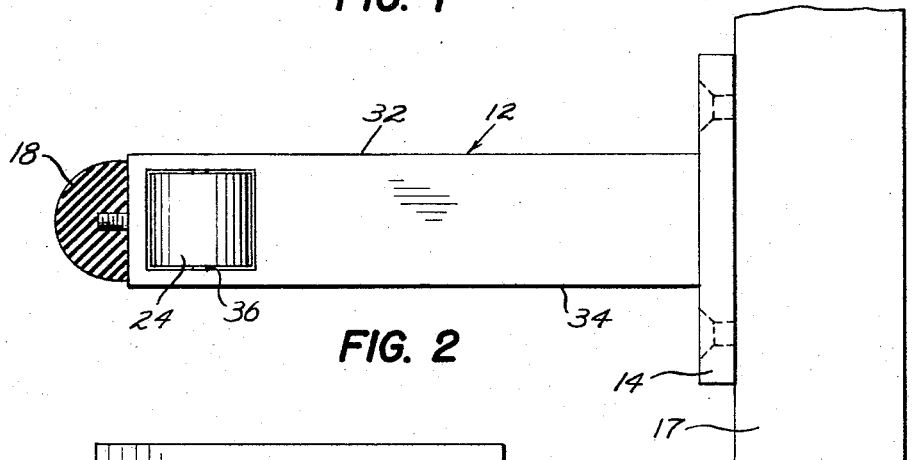
FIGURE 2 is a view in elevation of the probe of FIGURE 1, partly in section.
Figure 3:
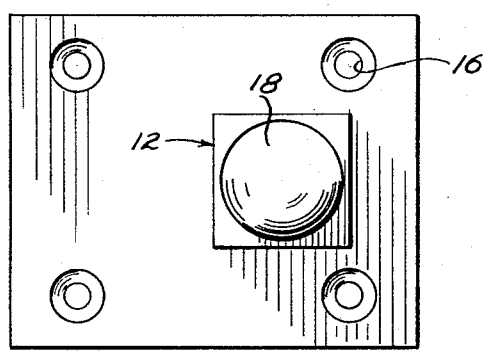
FIGURE 3 is an end view taken from the left end of the probe of FIGURE 2.

Referring in detail to the drawings, a combined door bumper and holder 10 in accordance with the present invention is shown to include an arm 12 having a base flange 14 attached to one end thereof. The flange 14 is provided with a plurality of screw openings 16 therethrough to receive screws to fasten arm 12 to a door 17. Arm 12 has a bumper 18 of resilient material fastened to the end thereof opposite the flange 14 and secured thereto as by means of a screw 20. Intermediate the flange 14 and the end of the arm mounting bumper 18, a recess 22 is formed opening onto the side of the arm adjacent the bumper. A metal strike 24 is positioned within recess 22 which strike is in the shape of a cylinder having a flat portion 26 to which a plate 28 is fastened as by welding. An elongated slot 30 is formed in the top 32 and bottom 34 of the arms to extend transversely thereof. A pin 36 is axially positioned in each end of the cylindrically shaped strike 24 and is received in the slots 30 to permit the strike 24 to move laterally of the arm between the solid line position and an extended position as depicted by dotted lines in FIGURE 1. As seen in FIGURE 1, a spring 38 is positioned within recess 22 to bias strike 24 into the extended position and the outward limit of movement is controlled by pins 36 in slots 30.

Figure 4:
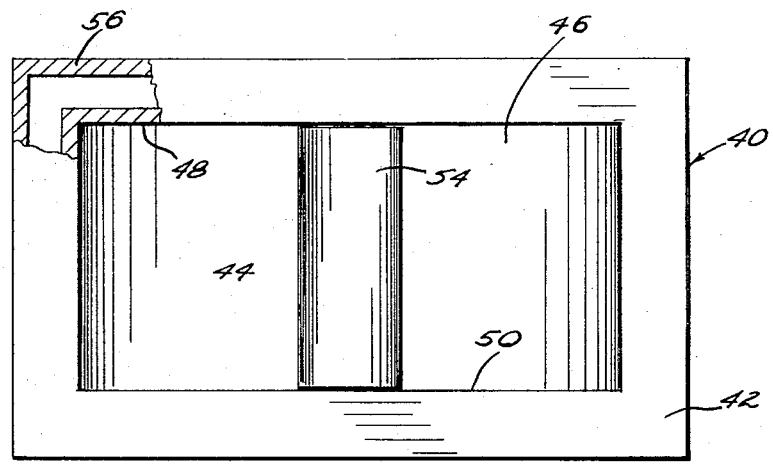
FIGURE 4 is a view in elevation of the bumper plate and strike retainer, partly in section.
Figure 5:
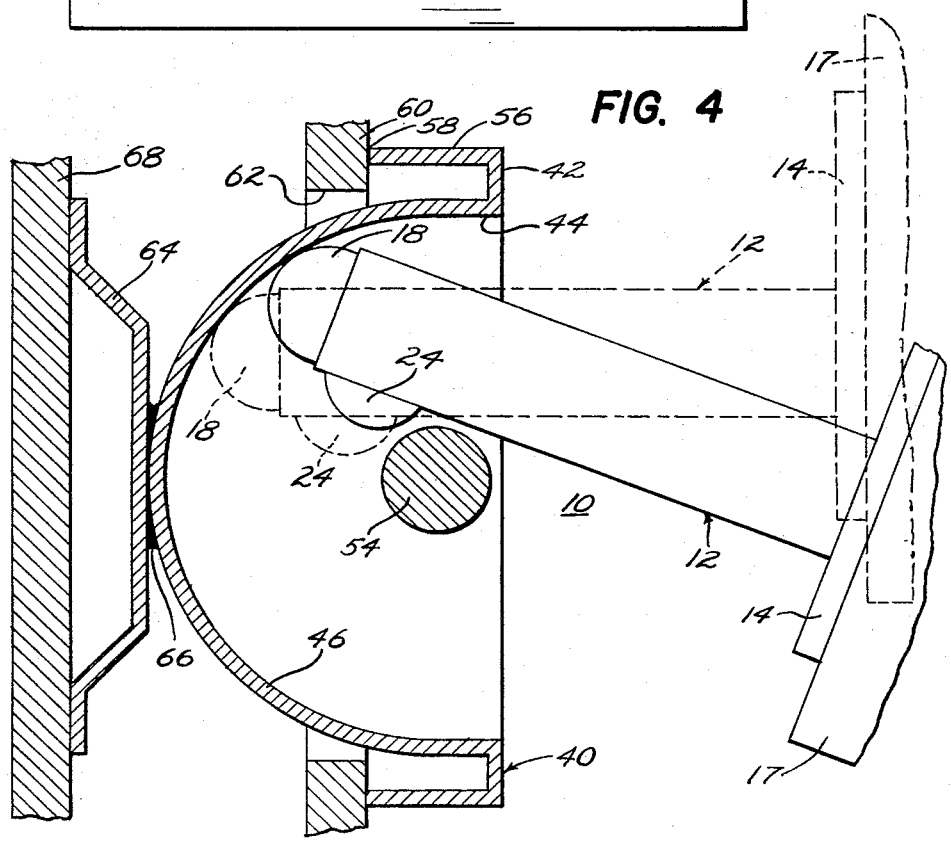
FIGURE 5 is a plan view partly in cross section of the bumper plate and strike retainer showing the proble of FIGURE 1 in solid lines in retained position where the door is other than parallel to the wall and in dotted lines where the door is parallel to the wall.

Referring now to FIGURES 4 and 5, there is shown a bumper plate and holder 40 which comprises a box having a front margin 42 having therein a recess 44 with a circular concave shaped back wall 46. The top 48 and bottom 50 of recess 44 are substantially planar. A metal roller 54 is positioned within recess 44 to extend from the bottom 50 to the top 48 of the recess and is mounted for rotary movement about an axis forming the center of curvature of concave back wall 46. The front margin 42 has a rearwardly turned flange 56 whose rearmost extremity 58 engages wall 60 having an opening 62 therein through which the concave wall 46 of the bumper plate and holder 40 extends. The flange 56 is of a dimension to position the roller 54 forwardly of the wall 60 in the direction of the arm 12 mounted on the door. The concave wall 46 has a securing bracket 64 attached to the outer rearward extremity thereof as by welding 66, which bracket is secured to an element 68 of the wall 60 as by means of screws and the like, not shown.

As best seen in FIGURE 5, the arm 12 is mounted on a door 17 and the bumper plate and holder 40 is mounted into a wall 60 such that when the door is opened completely the strike 24 of arm 12 just passes to one side of roller 54. It will be seen that as the strike 24 passes roller 54 the strike 24 will be forced into the recess 22 against the bias of opening 38. After the strike passes roller 54, the spring will force strike 24 into the extended position and retain the arm and the door in open position. As the strike 24 of arm 12 travels beyond roller 54, FIGURE 5, it will be seen that the bumper 18 will engage the concave wall 46, which absorbs the shock of stopping the travel of door 17. It will be noted, however, that since the wall 46 is inclined, arm 12 will tend to be forced toward roller 54 at the moment of impact. This resultant force pushing arm 12 against roller 54 serves to better retain strike 24 behind the roller 54.

It will be noted in FIGURE 5 that the door 17, with its attached arm 12, in solid lines is opened considerably beyond being parallel to wall 60, yet because the curved wall 46 has a radius which is large compared with the strike 24 and roller 54, that the arm 12 is received and retained whether the approach thereof is essentially normal to the wall as shown by the dotted lines or considerably beyond normal as depicted in solid lines.

The present door bumper and holder has its greatest utility in modern building structures, such as schools, where it is impracticable to position the hinged side of a door close enough to a wall to be able to conveniently hold the door open in a position parallel to a wall. The holder of this invention permits holding a door open even though it makes quite an angle with the wall and yet is easily released when desired. Also the particular angle is easily accommodated without requiring a special holder.

While there has been described what at present is considered to be the preferred embodiment of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A combined door bumper and holder which comprises an arm having a base flange on one end for mounting the arm on a door, a bumper of resilient material connected to the end of the arm opposite the end having the base flange, a recess in the arm opening onto the side thereof adjacent the end to which the bumper is connected, a cylindrically shaped strike positioned in the recess for limited movement transversely of said arm, spring means biasing said strike for movement outwardly of said arm and a bumper plate mounted adjacent the door having a recessed portion with a circular concave back wall and upper and lower wall portions, said recessed portion being adapted to receive and receiving the bumper of said arm, an elongated cylindrical roller mounted in the recess between the upper and lower wall portions for rotary movement about an axis containing the center of curvature of said concave wall portion in position to pass the strike of said arm in retracted position and permit the strike to extend and be retained therebehind.

2. The combination of claim 1 wherein the cylindrical strike is provided with pins axially positioned in each end and the recess of said arm has an upper wall portion and a lower wall portion provided with slots elongated transversely of said arm receiving said pins for limited transverse movement.

3. The combination of claim 2 wherein the strike is provided with a flatted side having attached thereto a plate whose width and height is at least as great as the diameter of the strike, with the plate being engaged by the spring.

4. The combination of claim 1 wherein the bumper plate is mounted in a wall and the recess is provided with a front wall margin with a wall engaging flange of such dimension to position the cylindrical roller forwardly of the wall in which the bumper plate is mounted.

5. The combination of claim 1 wherein the radius of curvature of the circular concave wall portion of the bumper plate is sufficient to permit the strike of the arm to at least pass the roller as the bumper engages the wall with the arm approaching the bumper plate from any one of several directions.

References Cited by the Examiner

UNITED STATES PATENTS

| | | | |
|---|---|---|---|
| 723,219 | 3/1903 | Thorpe | 292—74 |
| 2,809,061 | 10/1957 | Beyer | 292—75 |

EDWARD C. ALLEN, *Primary Examiner.*

J. R. MOSES, *Assistant Examiner.*